United States Patent [19]

Sydansk

[11] Patent Number: 4,625,802

[45] Date of Patent: Dec. 2, 1986

[54] POTASSIUM SILICATE CLAY STABILIZATION PROCESS

[75] Inventor: Robert D. Sydansk, Littleton, Colo.

[73] Assignee: Marathon Oil Company, Findlay, Ohio

[21] Appl. No.: 716,735

[22] Filed: Mar. 27, 1985

Related U.S. Application Data

[63] Continuation-in-part of Ser. No. 627,993, Jul. 3, 1984, abandoned.

[51] Int. Cl.$^4$ .............................................. E21B 43/12
[52] U.S. Cl. .................................... 166/292; 166/300; 166/305.1; 252/8.551; 405/263
[58] Field of Search ............... 166/270, 273, 274, 275, 166/292, 300, 305 R; 106/900; 252/8.55 R, 8.55 D; 405/263

[56] References Cited

U.S. PATENT DOCUMENTS

| | | | |
|---|---|---|---|
| 3,123,135 | 3/1964 | Bernard et al. | 166/275 X |
| 3,438,443 | 4/1969 | Prats et al. | 166/305 R X |
| 3,640,343 | 2/1972 | Darley | 166/292 |
| 3,679,001 | 7/1972 | Hill | 166/292 |
| 3,777,817 | 12/1973 | Feuerbacher et al. | 166/273 X |
| 4,011,908 | 3/1977 | Holm | 166/273 |
| 4,072,019 | 2/1978 | Pearson | 106/900 X |
| 4,458,755 | 7/1984 | Southwick et al. | 252/8.55 R X |
| 4,521,136 | 6/1985 | Murphey | 166/292 X |

OTHER PUBLICATIONS

Moore, "Clay Mineralogy Problems in Oil Recovery: Part 1", *The Petroleum Engineer*, Feb. 1960, pp. B40–B47.

Moore, "Clay Mineralogy Problems in Oil Recovery: Part 2", *The Petroleum Engineer*, Mar. 1960, pp. B78–B100.

*Primary Examiner*—George A. Suchfield
*Attorney, Agent, or Firm*—Jack L. Hummel; Rodney F. Brown

[57] ABSTRACT

An aqueous solution having potassium silicate dissolved therein is injected into a subterranean sandstone formation containing water-sensitive fine particles, including clays. Potassium silicate stabilizes the fine particles for a substantial period of time thereby substantially preventing formation permeability damage caused by encroachment of aqueous solutions having a distinct ionic makeup into the treated formation.

28 Claims, No Drawings

POTASSIUM SILICATE CLAY STABILIZATION PROCESS

This is a continuation-in-part application of copending patent application Ser. No. 627,993 filed July 3, 1984, now abandoned.

TECHNICAL FIELD

The invention relates to a process for stabilizing clays present in a water-sensitive, subterranean sandstone formation, and more particularly, to a process for stabilizing clays present in the environment near a well bore penetrating a water-sensitive, subterranean hydrocarbon-bearing sandstone formation for a substantial period of time.

BACKGROUND ART

Encroachment of aqueous solutions, having a distinct ionic makeup from connate water into subterranean oil-bearing sandstone formations containing clays, often result in reduced fluid flow, and therefore, reduced oil production or fluid injection. Ionically distinct fluids can encroach into a subterranean sandstone formation from a variety of sources, such as an underlying aquifer, a secondary or tertiary oil recovery flood or treatment fluids utilized in the near well bore environment. Two different types of clay damage can result from encroachment of aqueous solutions having distinct ionic makeup. First is clay swelling. Swellable clays, such as montmorillonite, have interstitial layers. Fresh water contact affects the ionic properties between these interstitial layers and swells these clays thereby impeding fluid flow therethrough. Second is clay particle migration. Migratable clays, such as poorly cemented kaolinite and illite clay particles, become detached from the subterranean sandstone formation during flow of fresh water therethrough. The resultant mobile clay particles can become trapped in the formation pore-throat openings thereby reducing permeability and fluid flow therethrough. Encroachment of aqueous solutions having a distinct ionic makeup, such as fresh water, often results in the occurrence of both types of permeability damage.

U.S. Pat. No. 4,280,560 to Sydansk provides a clay stabilization process utilizing potassium hydroxide, which prevents fresh water permeability damage to subterranean formation containing clays by permanently stabilizing such clays. However, the effectiveness of this process is, to an extent, limited by the kinetics of the caustic/sandstone interaction. Generally, the kinetics of the process are considerably less favorable in low temperature formations. As such, a clay stabilization process is needed which has more favorable kinetics, especially in low temperature formations.

DISCLOSURE OF INVENTION

The present invention provides a process for stabilizing water-sensitive fine particles, including clays, present in a subterranean sandstone formation for a substantial period of time. An aqueous solution having a water-soluble potassium silicate dissolved therein is injected into the sandstone formation. The potassium silicate effectively reduces formation permeability damage caused by encroachment of aqueous solutions having a distinct ionic makeup into the formation. Potassium silicate concentration and/or potassium silicate contact time with the formation can be varied as a function of formation properties, including temperature, to ensure effectiveness of the process.

BEST MODE OF THE INVENTION

The present invention relates to a process for stabilizing clays present in a water-sensitive, subterranean sandstone formation for a substantial period of time. As utilized throughout this description, the term "clay stabilization" refers to treating a sandstone formation in such a manner as to substantially prevent permeability damage and fluid flow reduction caused by any variation in salt (ionic) makeup of injection and produced waters. Reduced fluid flow results from negative interaction between an aqueous solution having a distinct ionic makeup, such as, fresh water, and fine particles, including clays. Fine particles which are involved in fresh water permeability damage include all swelling and potentially mobile fine particles present within sandstone pore bodies. Fine particles are those particles which have diameters less than 37 microns. Examples of fine particles which can contribute to permeability damage are clays, high surface area silica, mica, feldspars, and barite. As utilized throughout this description, the term "clays" encompasses both swelling clays, such as, montmorillonite, vermiculite, swelling chlorite, and mixed layered swelling clays and migratable clays, such as, poorly cemented kaolinite and illite clay particles. "Mixed layered swelling clays" is inclusive of layered mixtures of swelling and non-swelling clays which will swell when contacted with fresh water. The term "fresh water" refers to an aqueous solution which has a relatively low concentration of dissolved salts, including monovalent ions.

The process of the present invention comprises the injection of an aqueous potassium silicate solution into a water-sensitive, subterranean sandstone formation. The injected potassium silicate solution effectively stabilizes clays for a substantial period of time thereby substantially preventing fresh water permeability damage and reduced oil production.

The aqueous potassium silicate solution consists essentially of water, water-soluble potassium silicate and optionally potassium hydroxide. Potassium salts may also be incidentally present in the solution. By incidental, it is meant that potassium salts are neither harmful nor necessary to the process. As such they are generally not purposely added to the solution, but may be tolerated in the solution as an impurity. However, it is essential that substantially no metal cations other than potassium are present in the potassium silicate solution because other metal cations counteract the clay stabilizing effect of the potassium silicate ions and diminish the effectiveness of the treatment. Therefore, the water must be substantially free of impurities other than potassium salts.

While it is not completely understood exactly why such stabilization results, it is believed that the clay stabilization is the result of an irreversible reaction between the silicate ions and the sandstone in the presence of potassium ions. The silicate/sandstone reaction produces a fine potassium silicate precipitate. The potassium silicate precipitate envelops the clay particles preventing fresh water from contacting the clays. The precipitate also cements migratable clay particles to pore walls of the formation. The in situ silicate/sandstone reaction is limited by the silicate ion concentration in the formation. Therefore it is essential to establish a predictable relatively high silicate concentration within the formation by directly injecting the potassium silicate solution into the formation as the present process provides. As such, the effectiveness of the treatment process is within the immediate control of the practitioner.

A second less significant factor may also contribute to the stabilization process. The treatment can induce some of the silicon-oxygen bonds in the clay to break and reform such that migratable clay particles chemically bond to the sandstone formation pore walls and/or interstitial layers of swelling clays chemically bond together.

The process of the present invention is applicable to a wide range of subterranean sandstone formation temperatures and also to a wide range of subterranean sandstone formation mineralogies. The process of the present invention can be applied to subterranean sandstone formations having a temperature of about 20° C. up to about 85° C. and above and preferably about 20° C. to about 50° C. Due to favorable kinetics, treatment effectiveness is not substantially diminished at the lower end of the temperature range.

Preferably, the potassium silicate solution of the present invention is injected into the near well bore environment of a subterranean sandstone formation. As utilized throughout this description, the term "near well bore environment" denotes the volume of the subterranean sandstone formation matrix surrounding a well bore penetrating the same which exhibits relatively homogeneous horizontal characteristics. The "matrix" is the continuous mineral material comprising the formation, in distinction to discontinuous structures in the formation, such as a well bore hole.

As a general guide, the near well bore environment usually extends a radial distance into the formation matrix of up to about 3 meters from the well bore face and may extend up to about 9 meters or more into the formation matrix. Because the greatest fluid pressure drop, fluid velocity and quantity of fluid transported occurs in the near well bore environment of a subterranean formation, the near well bore environment is the volume of a subterranean formation most susceptible to clay damage. Additionally, permeability damage in the near well bore environment has the greatest effect on fluid injection and production. The process is applicable to both oil production and fluid injection well bores.

It is essential to treat substantially the entire near well bore environment which includes the near well bore portion of the formation matrix and not just the well bore face. Although the far well bore region may also be treated, far well bore applications are not preferred because they are relatively expensive and of decreased value since clay stabilization problems are less acute in the far well bore region.

Treatment effectiveness is partially dependent upon the potassium silicate concentration in the treatment solution. The concentration of potassium silicate utilized in the aqueous solution can range from about 0.1 up to about 30 wt.%, preferably about 1 to about 15 wt.%, and more preferably about 1 to about 7 wt.%. The aqueous treatment solution may contain potassium hydroxide in a range from about 1 to about 30 wt.% in addition to the potassium silicate. When potassium hydroxide is preseent in the treatment solution, the preferred concentration range of potassium silicate is generally narrower, i.e., from about 0.1 to about 15 wt.% and preferably about 0.3 to about 10 wt.%.

Treatment effectiveness is also dependent upon the contact time of the treatment fluid with the near well bore environment. Contact time can range from a lower limit which is dictated by the kinetics of the silicate sandstone interaction to an upper limit which is dictated by the economics involved in unrealized hydrocarbon production due to shutting in a well bore during treatment. Contact time for effective treatment is preferably from about 1 hour to about 72 hours and more preferably about 24 hours.

The desired contact time is achieved by static or continuous treatment. In a static method, the treatment fluid is injected into the treatment zone and held static therein for a given soak time, i.e., contact time. In a continuous method, the potassium silicate solution is injected into the formation continuously over the duration of the desired contact time at a finite solution flow rate to minimize the risk of minor formation permeability damage. Any frontal advance rate greater than about 0.03 m/day will effectively prevent treatment permeability damage. Although significantly larger frontal advance rates can be utilized, such rates usually provide little additional benefits. Excessively large flow rates should be avoided due to high chemical cost.

The following examples are illustrative of the application of the process of the present invention to stabilize clays in a water-sensitive, subterranean sandstone formation and are not to be construed as limiting the scope thereof. Three distinct indicia are utilized throughout the following examples to evaluate the effectiveness of clay stabilization treatments. All three indicia utilize the ratio $k_{final}/k_{initial}$, ($k_f/k_i$), which is the ratio of the final fluid permeability measured after a given operation to the initial fluid permeability measured prior to application of any operation. The first indicia is the ratio $(k_f/k_i)_t$ which is the ratio of fluid permeability of a subterranean sandstone formation core measured after application of a given treatment to the fluid permeability of the core measured prior to treatment application. This ratio indicates the permeability damage which is attributable to the treatment. Such damage may result from, for example, in situ precipitation of constituents of a treatment fluid. An ideal treatment should result in $(k_f/k_i)_t$ equalling 1.0. The second indicia is the ratio $(k_f/k_i)_{cs}$ which is the ratio of the fluid permeability of a subterranean sandstone formation core measured after application of a given clay stabilization treatment, and subsequent 3.0 wt.% NaCl and distilled water floods to the fluid permeability of the core measured prior to application of any operation. The ratio $(k_f/k_i)_{cs}$ indicates the susceptibility of the treated plug to permeability damage due to encroachment of an aqueous solution having a distinct ionic makeup after application of a clay stabilization treatment. An effective clay stabilization treatment should result in a $(k_f/k_i)_{cs}$ ratio which approximates $(k_f/k_i)_t$. The third indicia is the ratio $(k_f/k_i)_c$ which is the ratio of the fluid permeability of a comparable untreated subterranean sandstone formation core measured after a distilled water flood to the fluid permeability of the core measured prior to application of any operation. The ratio $(k_f/k_i)_c$ indicates susceptibility (or sensitivity) of the plug to permeability damage due to fresh water encroachment when the plug has not been previously treated in an attempt to stabilize clays. The fluid utilized to measure fluid permeability of the core before or after any operation may be crude oil or brine. Two distinct fluids can be utilized to measure the fluid permeability of one core.

To evaluate the effectiveness of a clay stabilization treatment, the $(k_f/k_i)_{cs}$ ratio must be evaluated with respect to the $(k_f/k_i)_c$ ratio. Thus, when a subterranean sandstone formation plug is relatively sensitive to permeability damage due to fresh water, i.e., a relatively low $(k_f/k_i)_c$ ratio, for example, 0.01, a moderate $(k_f/k_i)_{cs}$ ratio, for example, 0.5, would indicate an effective treatment. However, when a plug is relatively insensitive to permeability damage due to fresh water, for example, a $(k_f/k_i)_c$ ratio is 0.4, the moderate $(k_f/k_i)_{cs}$ ratio of 0.5 would indicate a relatively ineffective clay stabilization treatment. As a general guide, divergent $(k_f/k_i)_{cs}$ and $(k_f/k_i)_c$ ratios coupled with a $(k_f/k_i)_{cs}$ ratio approaching $(k_f/k_i)_t$ indicate an effective clay stabilization treatment of a clay sensitive system. However, an otherwise effective treatment can actually be relatively ineffective if application of the treatment results in a high degree of formation permeability damage, i.e., a relatively low $(k_f/k_i)_t$ ratio.

EXAMPLE 1

A linear, unfired, homogeneous Berea sandstone plug having an initial permeability of 260 md is injected with 17 pore volume of a treatment solution comprised of 14.5% potassium hydroxide and 0.5 wt.% potassium metasilicate in fresh water for 24 hours at a frontal advance rate of 0.6 m/day. The injected fluids and plug are maintained at 85° C. by a heat exchanger. No detectable treatment-induced permeability damage occurs. The plug is then sensitized by flooding with 10 pore volumes of a non-damaging 3 wt.% sodium chloride solution followed by shock flooding with 10 pore volumes of distilled water at a frontal advance rate of 30 m/day. No permeability damage is detected after the shock flood, i.e., $(k_f/k_i)_t$ is approximately 1.0.

The plug is thereafter repeatedly distilled water shock flooded by the procedure above. Permeability reduction is less than 10%, i.e., $(k_f/k_i)_{cs} > 0.9$, after each flood, indicating little or no fresh water sensitivity after the potassium silicate treatment.

A second identical sandstone plug which has not undergone potassium silicate treatments is flooded with the sodium chloride solution followed by shock flooding with distilled water in the same manner as above. The permeability reduction of the plug is greater than 99%, i.e., $(k_f/k_i)_c < 0.01$, after the shock flood. The results indicate that the fresh water sensitivity of a sandstone plug is significantly and permanently decreased by treatment with an aqueous solution containing potassium silicate.

EXAMPLE 2

A homogeneous sandstone plug from an Oligocene-age reservoir is injected with 20 pore volumes of a treatment solution containing 15 wt.% potassium hydroxide and 0.3 wt.% potassium metasilicate in fresh water for over 24 hours at a frontal advance rate of 0.5 m/day. The injected fluids and plug are maintained at 85° C. by a heat exchanger. No treatment-induced permeability damage is detected at residual crude saturation with formation brine and crude oil, i.e., $(k_f/k_i)_t$ is approximately 1.0. The plug is sensitized by flooding with 10 pore volumes of a non-damaging 3 wt.% sodium chloride solution followed by shock flooding with 10 pore volumes of distilled water at a frontal advance rate of 30 m/day. Permeability reduction is only 9%, i.e., $(k_f/k_i)_{cs} = 0.91$.

A second nearly identical sandstone which has not undergone potassium silicate treatment is flooded with the sodium chloride solution followed by shock flooding with distilled water in the same manner as above. The permeability reduction of the plug is 80%, i.e., $(k_f/k_i)_c = 0.20$.

EXAMPLE 3

The same core material as Example 2 is injected with 8 pore volumes of a 2 wt.% potassium metasilicate solution for 24 hours. The injected fluids and plug are maintained at 80° C. Little treatment induced permeability damage is detected thereafter, i.e., $(k_f/k_i)_t > 0.90$. The plug is then sensitized by flooding with a sodium chloride solution followed by distilled water shock flooding in the manner of Example 1. The permeability reduction after the treatment remains relatively constant, i.e., $(k_f/k_i)_{cs} > 0.90$. The results indicate that treatment of a formation with an aqueous solution containing water-soluble potassium silicate by itself effectively provides clay stabilization.

EXAMPLE 4

In these series of experiments, four Berea sandstone plugs identical to those of Example 1 are treated with different treatment fluids at different temperatures. Treatment consists of initially flooding the cores with about 20 pore volumes of the respective treatment solution for 24 hours at a frontal advance rate of 0.6 m/day. The plug is then sensitized by flooding with about 10 pore volumes of a non-damaging 3 wt.% sodium chloride solution followed by shock flooding with 10 pore volumes of distilled water at a frontal advance rate of 24 m/day. The results are displayed in the table below.

| | Experimental Run No. | | | |
|---|---|---|---|---|
| | 1 | 2 | 3 | 4 |
| Treatment Material | Potassium Hydroxide | Potassium Hydroxide | Potassium Hydroxide | Potassium Metasilicate |
| Concentration (wt. %) | 30.0 | 15.0 | 15.0 | 5.0 |
| Temperature (°C.) | 22 | 85 | 22 | 22 |
| $(k_f/k_i)_t$ | 0.80 | >1.0 | 0.87 | 0.91 |
| $(k_f/k_i)_{cs}$ | 0.80 | 1.0 | 0.02 | 0.78 |
| $(k_f/k_i)_c$ | <0.01 | <0.01 | <0.01 | <0.01 |

The results clearly show that the effectiveness of the potassium hydroxide treatment solution is kinetically dependent. The potassium hydroxide treatment of run 2 is very effective at a 15% concentration and high temperature as indicated by the three permeability ratios. However, when the temperature is reduced in run 3, the treated plug is very susceptible to permeability damage. It is necessary to double the concentration of the potassium hydroxide in solution to achieve an acceptable value for $(k_f/k_i)_{cs}$ at low temperature as shown in run 1.

In contrast, when applying the process of the present invention in run 4, fresh water permeability damage is unexpectedly very limited. Because of more favorable kinetics, the instant potassium silicate treatment process is much less sensitive to variations in formation temperature than the potassium hydroxide treatment process. The potassium metasilicate solution can be employed at substantially lower concentrations than potassium hydroxide to effect clay stabilization in low temperature reservoirs.

EXAMPLE 5

The same core material as Example 2 is injected with 8 pore volumes of a solution containing 2 wt.% potassium metasilicate and 2 wt.% sodium chloride for a period of 24 hours. The injected fluids and plug are maintained at 80° C. Little treatment induced permeability damage is detected thereafter, i.e., $(k_f/k_i)_t > 0.85$. The plug is then sensitized by flooding with a sodium chloride solution followed by distilled water shock flooding in the manner of Example 1. The permeability reduction after the treatment is significantly lower, i.e., $(k_f/k_i)_{cs} = 0.20$. The results indicate that the presence of sodium metal cations in the treatment solution detracts from the ability of the potassium silicate to provide effective clay stabilization.

While the foregoing preferred embodiment of the inveton has been described and shown, it is understood that all alternatives and modifications, such as those suggested, and others may be made thereto and fall within the scope of the invention.

I claim:

1. A process for stabilizing clays present in a water-sensitive, subterranean sandstone formation having a matrix, the sandstone formation containing fine particles which interact with aqueous solutions having ionic makeup distinct from connate water to reduce permeability of the formation and fluid flow therethrough, the sandstone formation being penetrated by a well bore in fluid communication therewith, with process comprising:

injecting into the matrix of said subterranean sandstone formation via said well bore an aqueous solution consisting essentially of water and potassium silicate, said potassium silicate existing in said aqueous solution as potassium ions and silicate ions, said silicate ions interacting with said sandstone formation in the presence of said potassium ions to effectively render said fine particles relatively insensitive to said aqueous solutions having a distinct ionic makeup, and said potassium silicate being dissolved in said aqueous solution in a quantity sufficient to effectively render said fine particles relatively insensitive to said aqueous solutions having a distinct ionic makeup for a substantial period of time thereby preventing substantial permeability reduction of the formation matrix.

2. The process of claim 1 wherein said fine particles are clays.

3. The process of claim 2 wherein said clays comprise swelling clays and migratable clays.

4. The process of claim 3 wherein said swelling clays are selected from the group consisting of montmorillonite, swelling chlorite, vermiculite, mixed layered swelling clays and mixtures thereof.

5. The process of claim 3 wherein said migratable clays are selected from the group consisting of poorly cemented kaolinite clays, poorly cemented illite clays and mixtures thereof.

6. The process of claim 1 wherein said potassium silicate is dissolved in said aqueous solution in a concentration of from about 0.1 wt.% to about 30 wt.%.

7. The process of claim 6 wherein said potassium silicate is dissolved in said aqueous solution in a concentration of from about 1 wt.% to about 15 wt.%.

8. The process of claim 7 wherein said potassium silicate is dissolved in said aqueous solution in a concentration of from about 1 wt.% to about 7 wt.%.

9. The process of claim 1 wherein said aqueous solution having potassium silicate dissolved therein is in contact with said sandstone formation for a period of time from about 1 hour to about 72 hours.

10. The process of claim 1 wherein said sandstone formation is a hydrocarbon-bearing sandstone formation.

11. The process of claim 1 wherein said sandstone formation has a temperature of from about 20° C. to about 50° C.

12. The process of claim 1 wherein said aqueous solution having a distinct ionic makeup is fresh water.

13. The process of claim 1 wherein the clay stabilization is limited to the near well bore environment of the formation matrix.

14. A process for stabilizing clays present in a water-sensitive, subterranean sandstone formation having a matrix, the sandstone formation containing fine particles which interact with aqueous solutions having ionic makeup distinct from connate water to reduce permeability of the formation and fluid flow therethrough, the sandstone formation being penetrated by a well bore in fluid communication therewith, the process comprising:

injecting into the matrix of said subterranean sandstone formation via said well bore an aqueous solution consisting essentially of water, potassium silicate and potassium hydroxide, said potassium silicate and potasssium hydroxide existing in said aqueous solution as potassium ions, silicate ions and hydroxide ions, said silicate and hydroxide ions interacting with said sandstone formation in the presence of said potassium ions to effectively render said fine particles relatively insensitive to said aqueous solutions having a distinct ionic makeup, and said potassium silicate and potassium hydroxide being dissolved in said aqueous solution in a quantity sufficient to effectively render said fine particles relatively insensitive to said aqueous solutions having a distinct ionic makeup for a substantial period of time, thereby preventing substantial permeability reduction of the formation matrix.

15. The process of claim 14 wherein said fine particles are clays.

16. The process of claim 15 wherein said clays comprise swelling clays and migratable clays.

17. The process of claim 16 wherein said swelling clays are selected from the group consisting of montmorillonite, swelling chlorite, vermiculite, mixed layered swelling clays and mixtures thereof.

18. The process of claim 16 wherein said migratable clays are selected from the group consisting of poorly cemented kaolinite clays, poorly cemented illite clays and mixtures thereof.

19. The process of claim 14 wherein said potassium silicate is dissolved in said aqueous solution in a concentration of from about 0.1 wt.% to about 15 wt.%.

20. The process of claim 19 wherein said potassium silicate is dissolved in said aqueous solution in a concentration of from about 0.3 wt.% to about 10 wt.%.

21. The process of claim 19 wherein said potassium hydroxide is dissolved in said aqueous solution in a concentration of from about 1 wt.% to about 30 wt.% in an inverse relation to said concentration of potassium silicate.

22. The process of claim 14 wherein said aqueous solution having potassium silicate and potassium hydroxide dissolved therein is in contact with said sandstone formation for a period of time from about 1 hour to about 72 hours.

23. The process of claim 14 wherein said sandstone formation is a hydrocarbon-bearing sandstone formation.

24. The process of claim 14 wherein said sandstone formation has a temperature of from about 22° C. to about 85° C. and above.

25. The process of claim 14 wherein said aqueous solution having a distinct ionic makeup is fresh water.

26. The process of claim 14 wherein the clay stabilization is limited to the near well bore environment of the formation matrix.

27. A process for stabilizing clays present in a water-sensitive, subterranean sandstone formation having a matrix, the sandstone formation containing fine particles which interact with aqueous solutions having ionic makeup distinct from connate water to reduce permeability of the formation and fluid flow therethrough, the sandstone formation being penetrated by a well bore in fluid communication therewith, the process comprising:
injecting into the matrix of said subterranean sandstone formation via said well bore an aqueous solution consisting essentially of water and potassium silicate and one or more potassium salts, said potassium silicate existing in said aqueous solution as potassium ions and silicate ions, said silicate ions interacting with said sandstone formation in the presence of said potassium ions to effectively render said fine particles relatively insensitive to said aqueous solutions having a distinct ionic makeup, and said potassium silicate being dissolved in said aqueous solution in a quantity sufficient to effectively render said fine particles relatively insensitive to said aqueous solutions having a distinct ionic makeup for a substantial period of time thereby preventing substantial permeability reduction of the formation matrix.

28. A process for stabilizing clays present in a water-sensitive, subterranean sandstone formation having a matrix, the sandstone formation containing fine particles which interact with aqueous solutions having ionic makeup distinct from connate water to reduce permeability of the formation and fluid flow therethrough, the sandstone formation being penetrated by a well bore in fluid communication therewith, the process comprising:
injecting into the matrix of said subterranean sandstone formation via said well bore an aqueous solution consisting essentially of water, potassium silicate and potassium hydroxide and one or more potassium salts, said potassium silicate and potassium hydroxide existing in said aqueous solution as potassium ions, silicate ions and hydroxide ions, said silicate and hydroxide ions interacting with said sandstone formation in the presence of said potassium ions to effectively render said fine particles relatively insensitive to said aqueous solutions having a distinct ionic makeup, and said potassium silicate and potassium hydroxide being dissolved in said aqueous solution in a quantity sufficient to effectively render said fine particles relatively insensitive to said aqueous solutions having a distinct ionic makeup for a substantial period of time, thereby preventing substantial permeability reduction of the formation matrix.

* * * * *